Aug. 7, 1928. 1,679,424

E. O. HOPP

ELECTRIC HEATER

Filed Nov. 12, 1927

E. O. HOPP.
INVENTOR
BY Goldberg
ATTORNEY

Patented Aug. 7, 1928.

1,679,424

UNITED STATES PATENT OFFICE.

ERNEST O. HOPP, OF PORTLAND, OREGON.

ELECTRIC HEATER.

Application filed November 12, 1927. Serial No. 232,780.

My invention relates to electric heaters comprising a shell, a handle, and a heating element in the shell.

The objects of my invention are to provide a tool which is simple to manufacture and is particularly intended to be used by plumbers as a substitute for a blow torch in thawing out frozen water pipes; which can be attached to a pipe and left to do its work while the workman attends to other business; which does not involve the fire or explosion hazards of the gasoline blow torch; which may be used by plumbers to heat their soldering irons or melt their lead; and which may also be used by the ordinary householder as a room heater, a cooker, or a sad iron.

Other objects and advantages are to be found in the construction and arrangement of parts as will be described in the specification, and particularly pointed out in the appended claims.

I attain these objects with the mechanism illustrated in the accompanying drawings, in which.

Similar numerals refer to similar parts throughout the several views.

Figures 1, 2:
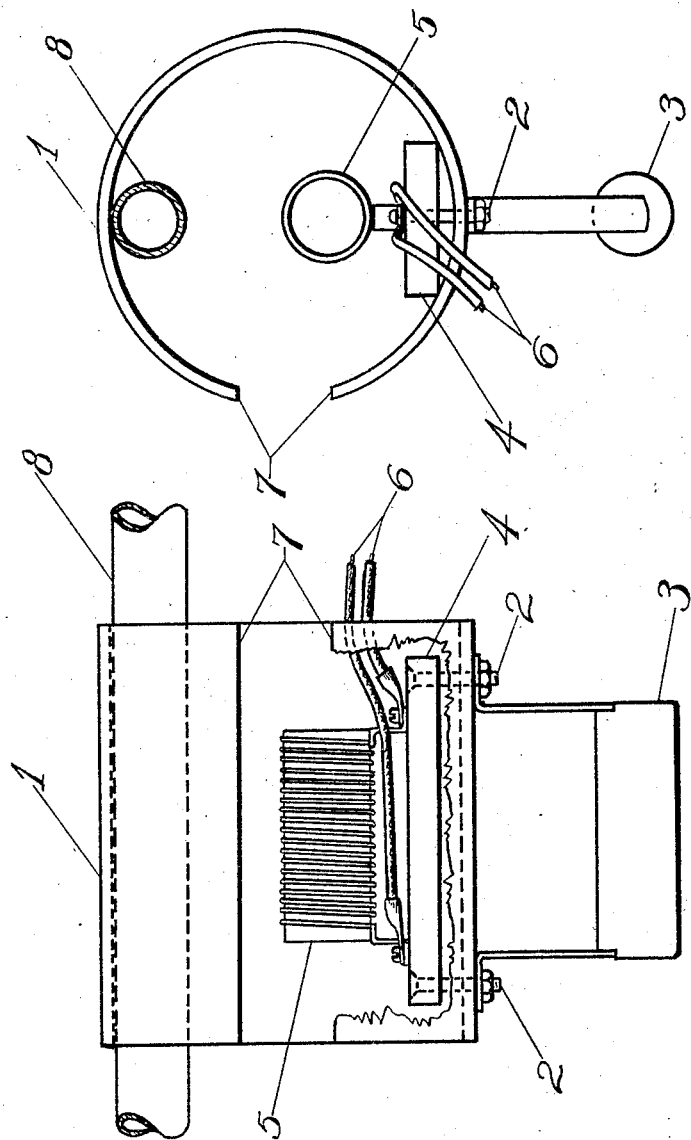
Fig. 1 is an end view of my heater.
Fig. 2 is a side view with the lower front portion of the shell broken away.

The cylindrical shell 1 is composed of metal, and may either be cast or simply cut off from a wrought iron pipe of suitable diameter. Attached to the outside of the shell, by means of the bolts 2 is a suitable handle 3. The bolts 2 may conveniently be employed to hold in place at the inside of the shell 1 a fire-resisting, insulating base 4. Mounted on the base 4 is a heating element 5 of desired form and heating qualities. The wires 6 which connect the heating element 5 with any convenient light socket may emerge at the open end of the shell 1, but should,—at least in the vicinity of the heating element 5,—be protected by fire-proof insulation. A slot 7 in the side of the shell 1 and continued throughout the full length of the shell 1 permits the heater to be hooked over a frozen water pipe 8 where it may be left while the workman attends to other duties. The greatest heat will of course be developed within the confines of the shell 1, but the ends being left open, the heat will also be distributed over a considerable length of the frozen pipe 8. Ample clearance within the shell 1 permits the heater to be shifted over joints and fittings without the necessity of unhooking the heater. Where it is desired to employ the heater on a vertical run of pipe, either a convenient fitting may be utilized as a support or otherwise a wrench or clamp must be attached to the pipe. There being no open flame, any hazards from the ignition of cobwebs, dust or particles of wood is eliminated. When used as a cooker, one end of the heater should be placed on a fire-proof surface, the other end may then be used to support the cooking utensil; the electric wires 6 in that case are preferably shifted from the open end to the slot 7.

Having thus described my invention, it will be seen that my objects have been accomplished, and, though I have shown the preferred form of construction, I reserve to myself the right to make minor changes, providing I do not violate the spirit and principle of my invention.

I claim:

1. An electric heater, comprising a cylindrical shell open at both ends, a handle attached to the outside of the shell, a heating element mounted at the side within the shell, and electrical wires from the heating element emerging at the open end of the shell.

2. In an electric heater, the combination of a cylindrical shell open at both ends, and a handle in parallel relation to the axis of the shell, with a fire-proof, insulating base parallel to the axis of the handle, base and handle being connected with each other, the base on the inside of the shell and the handle on the outside of the shell, a heating element mounted on the base, electrical wires from the heating element emerging at the open end of the shell, and a slot in the side of the shell continued throughout the full length thereof and removed ninety degrees from the handle.

3. In an electric heater, the combination of a cylindrical shell open at both ends and a continuous slot in one side, with a heating element attached to the side within the shell, said heating element being removed ninety degrees from the slot, electrical wires from the heating element emerging from the open end of the shell, and a handle in juxtaposition to the heating element, the clearance between the heating element and the opposite wall of the shell being substantially larger than the width of the slot.

In testimony whereof I affix my signature.

ERNEST O. HOPP.